United States Patent [19]
Engel et al.

[11] Patent Number: 5,334,360
[45] Date of Patent: Aug. 2, 1994

[54] APPARATUS FOR CONTINUOUS PRODUCTION OF TETRAPHOSPHORUS POLYSULFIDES

[75] Inventors: Philippe Engel, Villeurbanne; Alain Courant, Vienne, both of France

[73] Assignee: Atochem, Puteaux, France

[21] Appl. No.: 970,025

[22] Filed: Nov. 2, 1992

Related U.S. Application Data

[62] Division of Ser. No. 645,418, Jan. 24, 1991, Pat. No. 5,198,202.

Foreign Application Priority Data

Jan. 24, 1990 [FR] France ................. 90 00789

[51] Int. Cl.$^5$ .............................................. B01F 5/10
[52] U.S. Cl. ...................................... 422/230; 422/235
[58] Field of Search ................. 422/132, 230, 235; 423/303

[56] References Cited

U.S. PATENT DOCUMENTS

| | | | |
|---|---|---|---|
| 3,524,725 | 8/1970 | Cremer et al. | 423/303 |
| 3,927,982 | 12/1975 | Chapman et al. | 422/235 |
| 3,941,568 | 3/1976 | Kurtz et al. | 422/198 |

Primary Examiner—Robert J. Warden
Assistant Examiner—L. M. Crawford
Attorney, Agent, or Firm—Burns, Doane, Swecker & Mathis

[57] ABSTRACT

The tetraphosphorus polysulfides of the formula $P_4S_x$, wherein X is at least 3, especially tetraphosphorus decasulfide, $P_4S_{10}$, are prepared by (a) establishing a continuously circulating closed loop of a liquid reaction mixture which comprises desired final product tetraphosphorus polysulfide, (b) continuously introducing liquid phosphorus and liquid sulfur into such continuously circulating reaction mixture and therein continuously reacting the liquid phosphorus with the liquid sulfur, and (c) continuously separating desired final product tetraphosphorus polysulfide, in gaseous state, from such continuously circulating reaction mixture.

15 Claims, 2 Drawing Sheets

APPARATUS FOR CONTINUOUS PRODUCTION OF TETRAPHOSPHORUS POLYSULFIDES

This application is a divisional, of application Ser. No. 07/654,418, filed Jan. 24, 1992, now U.S. Pat. No. 5,198,202.

BACKGROUND OF THE INVENTION

1. Field of the Invention

The present invention relates to a continuous liquid phase process for the preparation of tetraphosphorus polysulfides and, in particular, $P_4S_{10}$.

This invention also relates to particular apparatus for carrying out the above process.

2. Description of the Prior Art

It is known to this art that the preparation of $P_4S_{10}$ from liquid sulfur and liquid phosphorus, at a temperature ranging from 250° C. to 515° C., entails a strongly exothermic reaction.

U.S. Pat. No. 2,794,705 indicates that this reaction may be carried out in an unagitated reactor by introducing liquid phosphorus and liquid sulfur into a mass of $P_4S_{10}$ maintained molten (515° C.) in a vessel. The heat generated by the reaction is used to vaporize the $P_4S_{10}$ formed.

Such a process presents a certain number of disadvantages. Due to the high viscosity of the medium—$P_4S_{10}$ has range of high viscosity above its melting point—the heat generated is poorly distributed; this results in delayed boiling and superheating of the product. Said super heating is manifested by powerful surges capable of damaging the reactor and its associated apparatus or of degrading the final product.

SUMMARY OF THE INVENTION

Accordingly, a major object of the present invention is the provision of an improved process for the preparation of tetraphosphorus polysulfides by reacting phosphorus with sulfur, comprising continuously charging a circulating reaction mixture with liquid phosphorus and liquid sulfur in proportions corresponding to the desired polysulfide(s), while controlling the temperature of such reaction mixture, separating the tetraphosphorus polysulfide(s) in the gaseous state from said reaction mixture, and wherein the circulation of the reaction mixture is carried out in a loop reactor, with such circulation being essentially provided by the density differences prevailing in said reaction mixture.

DETAILED DESCRIPTION OF THE PREFERRED EMBODIMENTS OF THE INVENTION

Figure 1:
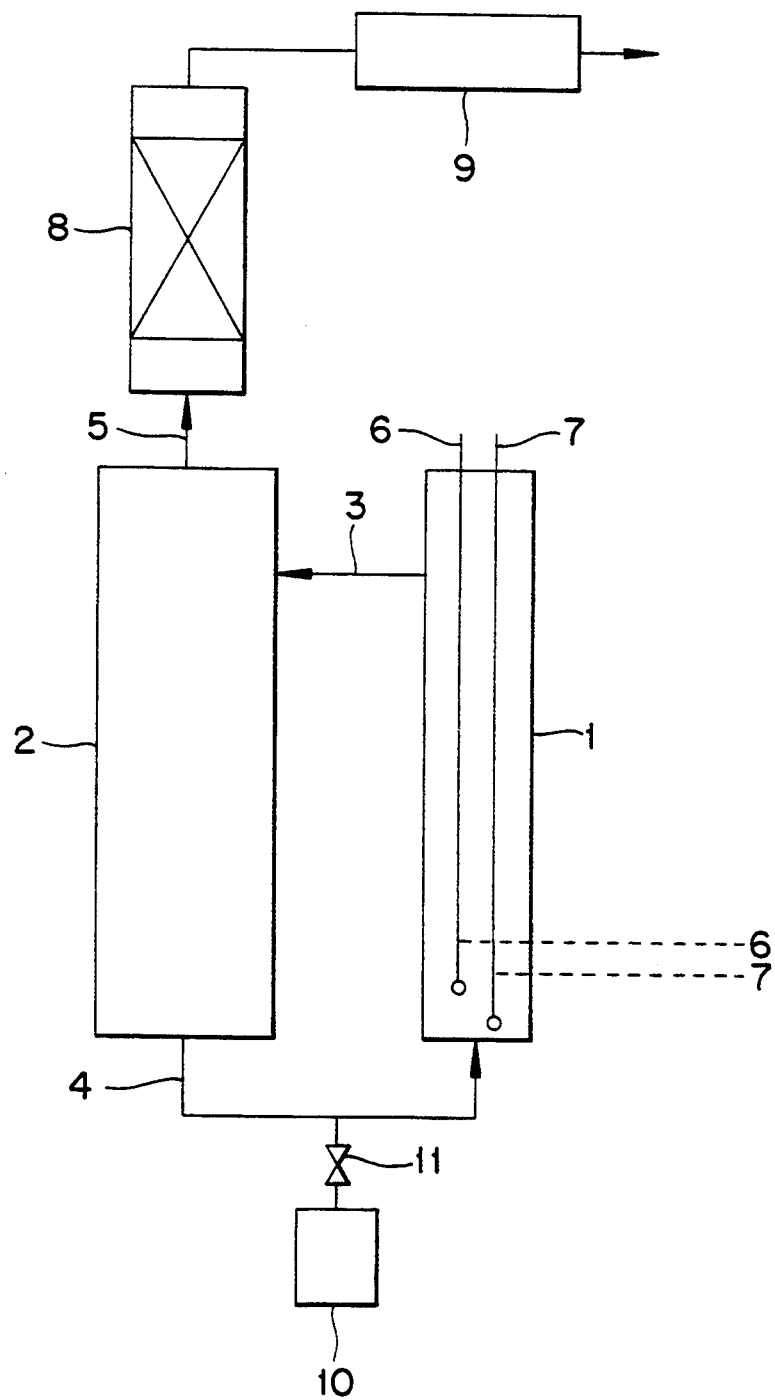
FIG. 1 is a schematic/diagrammatic illustration of one embodiment of the process/apparatus according to the present invention.

More particularly according to the present invention, the difference in the densities of the reaction mixture results from the progressive vaporization of the tetraphosphorus polysulfides in a section of the reactor, which initiates and maintains flow of the fluid.

This vaporization, provided by the exothermicity of the reaction, takes place in a region of the reactor in close proximity to the reactant feed, effecting a lowering in the density of the reaction mixture in this region, resulting from the vaporization of the products formed and from the high temperature.

This imparts a circulating motion to the reaction mixture due to a thermosiphon effect, and homogenizes the entire reaction system.

Although the heat released by the reaction is sufficient to cause this thermosiphon effect, any of the sections of the reactor may be advantageously heated, and preferably the section where the actual reaction takes place, i.e., in the region of the reactant feed.

According to an alternative embodiment of the process, the circulation of the reaction mixture which is maintained by the density differences may be additionally initiated and maintained by means of a circulation pump situated at any point along the reactor loop, but preferably at a point close to the reactant feed.

The process of the invention is well adopted for the preparation of tetraphosphorus polysulfides of the formula $P_4S_x$ in which X is at least equal to 3. It is very particularly applicable to the production of tetraphosphorus decasulfide $P_4S_{10}$.

The circulation velocity of the reaction mixture, excluding the starting stage, is at least 0.01 m/s and preferably ranges from 0.01 m/s to 1 m/s.

The average temperature of the reaction mixture, which can vary with pressure, is generally at least 300° C. and preferably ranges from 300° C. to 600° C.

The reaction is generally carried out under an inert gas and at an absolute pressure of at least 0.1 bar and generally ranging from 0.1 bar to 10 bars; this pressure preferably ranges from 1 bar to 2 bars.

The phosphorus and the sulfur are typically introduced into the reaction mixture at a temperature above their melting points and below their boiling points. Advantageously the phosphorus is introduced at a temperature ranging from 60° C. to 100° C. and the sulfur at a temperature ranging from 120° C. to 150° C.

The reactor may advantageously be initially charged with an amount of tetraphosphorus polysulfide which is heated to a temperature above its melting point and below its boiling point and into which the phosphorus and the sulfur are advantageously introduced.

With regard to the preparation of $P_4S_{10}$, it is advantageous to raise the temperature of the charged tetraphosphorus decasulfide to a value ranging from 350° C. to 550° C., and preferably close to 400° C.

The phosphorus and the sulfur are introduced in substantially stoichiometric amounts such as to form the desired product.

Also with regard to the preparation of $P_4S_{10}$, a P/S ratio equal to 4:10 will advantageously be employed. An excess of either of the reactants can result in the formation of secondary products and a significant decrease in the yield.

The phosphorus employed is advantageously white phosphorus, which may have been purified beforehand.

This process of the present invention can advantageously be carried out as shown diagrammatically in FIG. 1.

Such apparatus comprises a section 1, designated a reaction leg, which is generally cylindrical and substantially vertical, a section 2 which is generally cylindrical and substantially parallel to the reaction leg 1, these two sections typically communicating at their upper and lower ends by conduits 3 and 4, respectively, having a cross-section which is substantially equal to the cross-section of the reaction leg 1, at least one liquid phosphorus inlet 6 and at least one liquid sulfur inlet 7 which permit the liquid phosphorus and sulfur to be introduced into the lower half of the reaction leg 1, a discharge or outlet 5 for the tetraphosphorus polysulfide(s) in gaseous form being situated in the vicinity of any of the upper ends of the sections 1 and 2.

The section 2 advantageously has a diameter which is at least equal to the diameter of the reaction leg 1. The ratio of the diameter of the section 2 to the diameter of the 5 reaction leg 1 advantageously ranges from 1 to 5 and preferably from 2 to 3.

As indicated above, the apparatus for carrying out the process according to the invention comprises, at the upper end and advantageously at the top of section 2, a discharge or outlet 5 for the reaction products in gaseous form.

These products are then transported through a packed column 8 making it possible to control the impurities which may originate from the reactants and the by-products liable to be formed during the reaction.

These impurities and by-products can be collected in a vessel 10 by means of a valve 11 generally situated in the lower end of any one of sections 1 or 2, or conduit 4, which permits noncontinuous purging to be carried out.

The products exiting the column 8 are condensed in the tubular exchanger 9 and outlet in liquid form. After cooling, they can be subjected to the usual treatments (flaking, milling, packaging, etc.).

The liquid sulfur and the liquid phosphorus may advantageously be introduced into the reaction mixture at one or more points situated essentially along the bottom third of the reaction leg 1. They may be introduced at the same point, but it may be advantageous to introduce the sulfur at a level which is different from the phosphorus feed level.

The sulfur and the phosphorus may be introduced into the upper part of the reaction leg 1 by dip pipes, as shown in FIG. 1 (elements indicated by the numerals 6 and 7 shown as solid lines).

The phosphorus and the sulfur may also be introduced into the reaction leg 1 at other points, for example directly into the lower end of this leg (elements indicated by the numerals 6 and 7 shown as broken lines).

A slow stream of an inert gas, such as nitrogen, may also be introduced by other dip pipes or by these same pipes.

The characteristics of the reaction leg are related essentially to the velocity of circulation of the reaction medium and consequently to the physicochemical characteristics of the tetraphosphorus polysulfide which is produced. Insofar as $P_4S_{10}$ is concerned, it is known that above its melting point this compound comprises high viscosity ranges, and this requires good stirring to disperse the heat energy released by the reaction and consequently a high circulation velocity to disperse this heat energy uniformly and to promote the evaporation of the product formed.

To this end, a length of the reaction leg will be selected such as to provide a relatively short residence time. A reaction leg will advantageously be selected whose height-to-diameter ratio ranges from 2 to 20, inclusive, and preferably from 5 to 10.

The height may vary from 0.5 meters to 5 meters, but a height ranging from 1.5 meters to 3 meters will preferably be selected.

The sections 1 and 2 and conduit 4 may be provided with heating systems (not shown in FIG. 1) which may operate jointly or separately.

Figure 2:
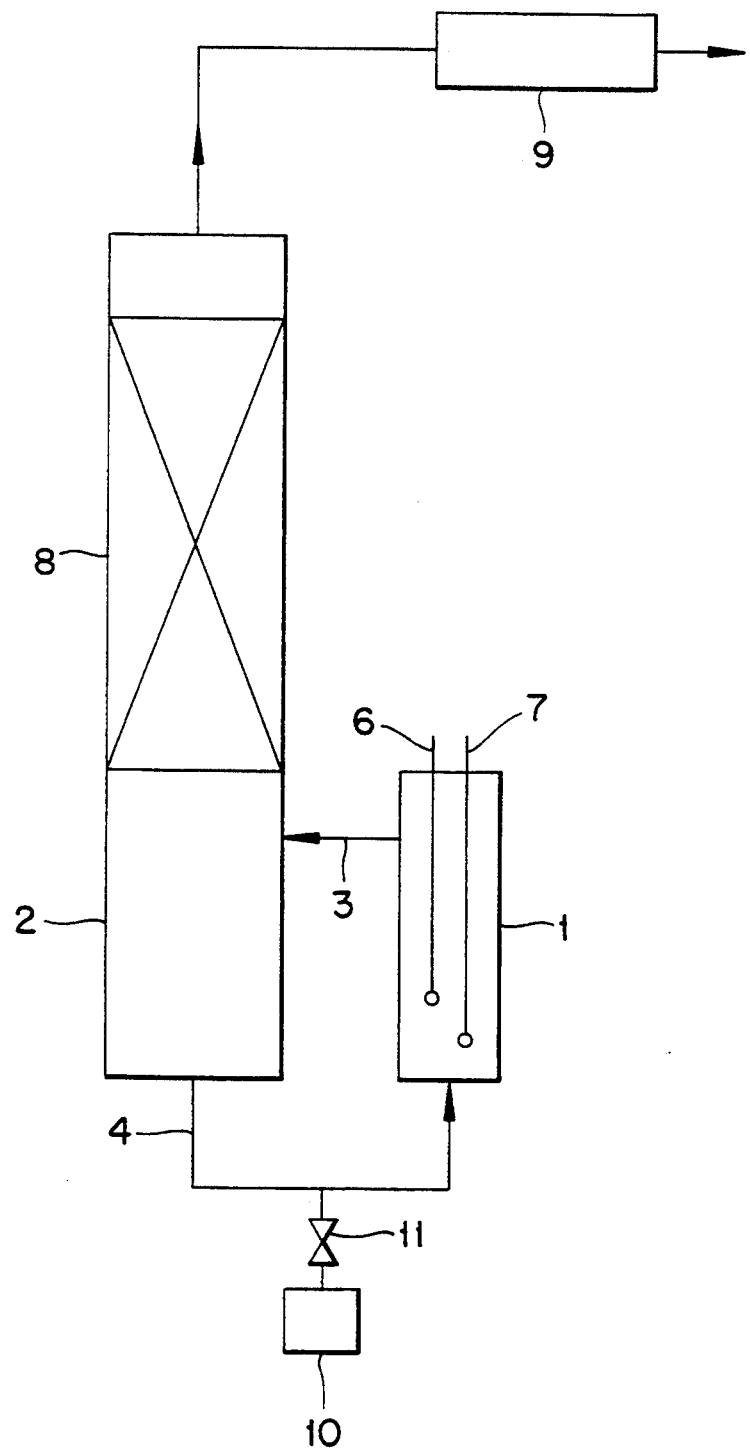
FIG. 2 is a schematic/diagrammatic illustration of another embodiment of the process/apparatus of the invention.

The process in accordance with the present invention may also be carried out using a special apparatus such as shown diagrammatically in FIG. 2. In this apparatus, the column 8 is superposed directly onto section 2, the discharge or outlet 5 is eliminated and the gaseous products formed are transported through the column 8 directly.

The process of this invention offers great flexibility. The circulation velocity of the reaction mixture can be varied widely, and this results in an excellent distribution of the heat energy within the reaction mixture and avoids superheating or delayed boiling of the products formed.

This high circulation in the reaction loop also makes it possible to reduce the degree of evaporation of the reactants in the system and consequently to conform to the stoichiometry of the reaction.

The process of the invention also does not require any stirrer, and this makes it possible to eliminate the risks of external leakages of the reactants and of the final products; this is a great advantage from the point of view of health, safety and of the environment.

In order to further illustrate the present invention and the advantages thereof, the following specific example is given, it being understood that same is intended only as illustrative and in nowise limitative.

EXAMPLE (a) The apparatus employed was that shown in FIG. 1, having the following characteristics:
(i) dimensions of the reaction leg 1: height, 2 m; internal diameter, 0.300 m;
(ii) internal diameter of section 2: 0.8 m;
(iii) inlets for the reactants 6 and 7 in the upper end of the reaction leg 1, with injection being into the lower third of the leg 1;
(iv) outlet for gaseous $P_4S_{10}$ at 5 at 520° C.;
(v) condensation of $P_4S_{10}$ in exchanger 9, which was cooled by a pressurized nitrogen circuit (4 bars, 320° C.); $P_4S_{10}$ exits the condenser at 335° C.;
(vi) heating of sections 1 and 2: heating power: (1) 20 kW (2) 5 kW.

(b) Operating Conditions:
600 kg of $P_4S_{10}$ were introduced into the apparatus described above and were progressively heated to 400° C.

At this temperature, sulfur and phosphorus were continuously introduced therein.

The sulfur was introduced at a temperature of 140° C. and at a flow rate of 720 kg/h.

The phosphorus was introduced at a temperature of 60° C. and at a flow rate of 280 kg/h.

A slow stream of nitrogen was also introduced at the same time as the phosphorus and the sulfur via the dip pipes.

The temperature in the reaction leg 1 increased progressively and stabilized at 520° C. At this stage, the fluid was in motion and had a circulation velocity of 0.3 m/s.

The reaction operated, thus, for 60 hours and yielded $P_4S_{10}$ at a flow rate of 1,000 kg/h.

The pressure measured at the top of section 2 was close to 1 bar absolute.

The $P_4S_{10}$ obtained had the following characteristics:
P % by weight : 27.8–28.5;

S % by weight : 71.5–72.2;
Fe % by weight : ≦0.05;
Melting point : 278° C.–280°C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Apparatus for the continuous preparation of a tetraphosphorus polysulfide, comprising a closed reactor loop, means for continuously circulating a liquid tetraphosphorus polysulfide reaction mixture in said reactor loop, means for establishing and continuously maintaining a density gradient within such continuously circulating reaction mixture, means for introducing liquid phosphorus and liquid sulfur into such continuously circulating reaction mixture, and means for continuously separating desired final product tetraphosphorus polysulfide, in gaseous state, from such continuously circulating reaction mixture, wherein said means for introducing liquid phosphorus is in fluid communication with a liquid phosphorus source and said means for introducing liquid sulfur is in fluid communication with a liquid sulfur source.

2. The apparatus as defined by claim 1, said closed reactor loop comprising a generally cylindrical and essentially vertical reaction leg for introduction of reactants and a generally cylindrical and essentially vertical reactor section substantially parallel thereto for removal of reaction products, said reaction leg and said reactor section communicating via an upper end and a lower end thereof as to define said closed loop.

3. The apparatus as defined by claim 2, said reaction leg and said reactor section communicating via conduit members having cross-sectional areas essentially the same as that of said reaction leg.

4. The apparatus as defined by claim 2, comprising means for introducing liquid phosphorus and liquid sulfur into a lower zone of said reaction leg.

5. The apparatus as defined by claim 2, said reactor section having a diameter at least equal to the diameter of said reaction leg.

6. The apparatus as defined by claim 5, wherein a ratio of the diameter of the reactor section over the ratio of the diameter of the reactor leg ranges from 1 to 5.

7. The apparatus as defined by claim 6, said ratio ranging from 2 to 3.

8. The apparatus as defined by claim 4, said liquid phosphorus and liquid sulfur introduction means being at different levels of said lower zone.

9. The apparatus as defined by claim 2, the height-to-diameter ratio of said reaction leg being at least 2.

10. The apparatus as defined by claim 9, said ratio ranging from 5 to 10.

11. The apparatus as defined by claim 9, said reaction leg having a height of at least 0.5 meter.

12. The apparatus as defined by claim 11, said reaction leg having a height ranging from 1.5 to 3 meters.

13. The apparatus as defined by claim 2, comprising fractioning and condensing means downstream of said means for continuously separating gaseous final product.

14. The apparatus as defined by claim 2, comprising fractioning means surmounting said reactor section.

15. The apparatus as defined by claim 2, said closed reactor loop comprising heating means therefor.

* * * * *